United States Patent Office 3,383,357
Patented May 14, 1968

3,383,357
POLYHEDRAL BORANE DIISOCYANATE POLYMERS
John C. Sauer, Wilmington, Del., assignor to E. I. du Pont de Nemours and Company, Wilmington, Del., a corporation of Delaware
No Drawing. Filed June 25, 1963, Ser. No. 290,891
9 Claims. (Cl. 260—47)

This invention relates to novel boron-containing polymers and their preparation. Specifically, the invention concerns polycarboxamides in which the amide nitrogens in the repeating unit are two nitrogens each bonded directly to boron atoms of divalently anionic $B_{10}$ and $B_{12}$ boron cage recurring units, and their preparation.

The many uses of synthetic polymers underscore their importance in the chemical art and have stimulated the search for polymers with new or improved properties. Recently two closely related, new chemical entities, the polyhedral borane anions $B_{10}H_{10}^=$ and $B_{12}H_{12}^=$, together with their substitution products, have been reported [Knoth et al., J. Am. Chem. Soc., 84, 1056 (1962)]. These anions and their substitution derivatives comprise a polyboron cage structure and are sometimes referred to as $B_{10}$ or $B_{12}$ boron cages or as polyboron compounds. Polymers containing these decahydrodecaborate(2-) and dodecahydrododecaborate(2-) boron cages have now been prepared from diisocyanate substituted $B_{10}$ or $B_{12}$ polyboron compounds.

The polymers of the invention may be described as polycarboxamides having the novel recurring units of the formula (1) 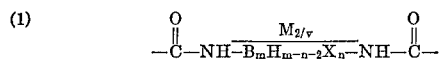

where

M is a cation, $v$ is the valence of M, and $2/v$ expresses the number of M groups present in terms of the ratio of M groups to one —$B_mH_{m-n-2}X_n$— group;

X is halogen, hydrocarbyl (—Q), hydrocarbyloxy (—OQ), hydrocarbyloxyhydrocarbyloxy (—OQ'OQ), hydrocarbylcarbonyl (—COQ), or hydrocarbylthio (—SQ), all free of aliphatic unsaturation;

$m$ is 10 or 12, and $n$ is a cardinal number between 0 and $m-2$, inclusive; and when $n$ is greater than 1, the X groups can be the same or different.

In the foregoing description the Q's represent hydrocarbyl and Q' represents divalent hydrocarbyl. Preferably X groups containing hydrocarbyl radicals are those containing up to 12 carbon atoms.

The polymers may be prepared by reacting at least one diisocyanate of the formula (2) 

with at least one complementary difunctional reactant of the type well known to form polymers with diisocyanates, as exemplified, for example, in U.S. 2,292,443; U.S. 2,511,544; U.S. 2,268,586; and U.S. 2,284,637.

Thus the polycarboxamides may be alternatively defined by the formula (3) 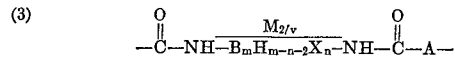

where M, $v$, X, $m$ and $n$ are as defined above and A is defined as a moiety supplied by a complementary difunctional reactant of the class known to react with diisocyanates to form polymers.

The M and M' components

The group M in Formulas 1 and 3 may be any of a wide number of cations. It may be, for example, an inorganic cation, or an organic or organo-inorganic cation.

When the valence of M is greater than 2, the term $2/v$ becomes fractional. In such cases, it is understood the term $2/v$ is used for convenience only, and that there are actually no fractional numbers of cations present. Therefore any amount of polymer containing a repeating unit of Formula 1 or 3 contains a whole number of cations. The same considerations apply to the term $M'_{2/v'}$ of Formula 2.

M or M' can be a cation of any metal in the Periodic Table shown in Deming's "General Chemistry," fifth edition, page 156 (Wiley, 1944), i.e., a metal of Groups I-A, II-A, III-A, IV-A, V-A, VI-A, I-B, II-B, III-B, IV-B, V-B, VI-B, VII-B, or VIII. For example, M can be lithium, potassium, rubidium, cesium, beryllium, magnesium, calcium, barium, strontium, copper, mercury, aluminum, tin, bismuth, silver, zinc, vanadium, chromium, manganese, ruthenium, cobalt, nickel, or any other metal. Preferred metal cations are those having valences of 1, 2, or 3. Especially preferred metals, for reasons of availability, are those of Groups I-A and II-A, i.e., alkali metals and alkaline-earth metals.

M or M' can also be an organic or organo-inorganic cation, for example, an ammonium, phosphonium, or sulfonium cation of the formula $U_2U'NH^+$, $U_3U'N^+$, $U'_4P^+$, or $U'_3S^+$, where U is aliphatically saturated hydrocarbyl bonded to the nitrogen, phosphorus, or sulfur through aliphatic carbon, U' is aliphatically saturated hydrocarbyl, and two U and/or U' groups can be joined together, directly or through an oxygen heteroatom, to form an alkylene or oxygen-interrupted alkylene radical. ("Alkylene" as used here refers to a divalent, saturated, aliphatic hydrocarbon radical, e.g., ethylene, —$CH_2CH_2$—.) Because of easier availability, cations in which U and U' contain at most 12 carbons each and any alkylene group contains at most 12 carbons are preferred. Examples are triisoproplammonium,
N-methylpiperidinium,
N-hexylmorpholinium,
pyridinium,
trihexylammonium,
diethyl-[2-(β-naphthyl)ethyl]ammonium,
N,N-dipropylanilinium,
benzyltrimethylammonium,
tetraisopentylammonium,
didodecyldiethylammonium,
butyldimethyl(phenyl)ammonium,
1,1-dimethylhexamethyleniminium,
tetrabenzylphosphonium,
ethyltriphenylphosphonium,
tetramethylphosphonium,
isobutylethylmethylpropylphosphonium,
ethylpentamethylene-p-tolylphosphonium,
tetra(α-naphthyl)phosphonium,
triphenylsulfonium,
methyltetramethylenesulfonium,
benzyldodecylmethylsulfonium,
methyldipentylsulfonium, and
trimethylsulfonium.

An especially preferred group of cations of this type are those in which the U and/or U' groups are the same and are lower alkyl, particularly the tetra(lower alkyl)ammonium cations.

A polymer having repeating units of Formula 1 or 3 and containing any of the above-recited cations can be made directly from a reactant of Formula 2. Therefore, the M' in Formula 2 can be any of the cations recited above. However, the polymers of the invention are not limited to those whose definition of M corresponds to that set forth above, for the polymers whose cation M is obtained directly from the reactant of Formula 2 can be subjected to a cation exchange reaction in which the cation is replaced by other cations of the type described below. This exchange is facilitated by the solubility of the polymers of the invention in ionizing solvents such as dimethylformamide, dimethylacetamide, and N-methylpyrrolidone. Any of the well-known techniques of cation exchange may be employed, particularly those involving the use of cation-exchange resins. Cations that can be introduced by these techniques include, for example, cations of the type recited above and also any of an extremely wide variety of other cations described below.

For example, by virtue of this possibility of cation-exchange, M in Formula 1 or 3 can be hydrogen, ammonium, or hydrazonium. As is the case with monomeric compounds containing the $B_{10}H_{10}^=$ and $B_{12}H_{12}^=$ ions and their substituted derivatives, when polymers of this invention in which M is hydrogen are prepared or worked with in the presence of electron-donor solvents or diluents, the polymers are ordinarily isolated as solvates, in which the solvated molecules are presumably associated with the hydrogen ions. Typical donor molecules of this type, i.e., molecules that can associate with hydrogen ions, are water, alcohols, ethers, nitriles, and carboxamides. An average of more or less than one such solvate molecule can be associated with a given hydrogen ion. When M is hydrogen, the presence or absence of solvate molecules, and the degree of solvation when such molecules are present, is not critical and is of no particular importance to the present invention. It is to be understood, therefore, that the term "hydrogen," as used here, i.e., as a value of M, includes hydrogen ions solvated with molecules of the types discussed above. This usage of the term "hydrogen" is based on nomenclature approved by the International Union of Pure and Applied Chemistry; see J. Am. Chem. Soc., 82, 5529–30 (1960).

M can also, for example, be a complex cation of any of the metals referred to above, e.g., tetramminecopper(II),
diamminezinc(II),
diaquotetramminechromium(III),
tris(1,2-propanediamine)chromium(III),
nitratopentamminecobalt(III),
dichlorobisethylenediaminecobalt(III),
dicyclopentadienyliron(III),
dibenzenechromium(I), and
tris(acetylacetonato)silicon.

As a further example, M can also be any of a very broad class of substituted ammonium or hydrazonium cations represented by the formulas $U'NH_3^+$, $UU'NH_2^+$, $U'N_2H_4^+$, $U'_2N_2H_3^+$, $U'_3N_2H_2^+$, and $UU'_3N_2H^+$, where U and U' are as previously defined. Examples are methylammonium,
cyclopropylammonium,
1-methylheptylammonium,
2-(1-naphthyl)ethylammonium,
diisobutylammonium,
dicyclohexylammonium,
dinonylammonium,
morpholinium,
dodecamethyleniminium,
phenylhydrazonium,
1-methyl-1-phenylhydrazonium,
1-methyl-2-isopropylhydrazonium,
dodecylhydrazonium,
1,1,2-triethylhydrazonium, and
1,1,1-tritetrabenzylhydrazonium.

Because of availability, the preferred types of cations of those described in the preceding three paragraphs are hydrogen, ammonium, (lower alkyl)ammonium, and di(lower alkyl)ammonium.

The X component

Among the previously defined X substituents that contain hydrocarbon moieties, a preferred class, for reasons of availability, is that in which the Q's are alkyl or cycloalkyl of at most 12 carbon atoms, i.e., alkyl, alkoxy, alkoxyalkoxy, alkylcarbonyl, alkylthio, cycloalkyl, cycloalkyloxy, etc. An especially preferred class is that in which any hydrocarbon moiety is saturated acyclic lower aliphatic hydrocarbon, i.e., lower alkyl. In this instance, each alkyl of the preceding sentence is preceded by the term "lower."

Examples of X substituents include fluorine, chlorine, bromine, iodine, ethyl, tert-butyl, cyclohexyl, octyl, dodecyl, 1-phenylethyl, methoxy, isopropoxy, cyclopentyloxy, phenoxy, 2-(2-naphthyl)ethoxy, 2-methoxyethoxy, 6-butoxyhexyloxy, 3-(p-tolyloxy)propoxy, ethylthio, isobutylthio, benzylthio, dodecylthio, acetyl, propionyl, isobutyryl, 2-octanoyl, benzoyl, cycloheptanecarbonyl, pivaloyl, 1-naphthoyl, and p-phenylbenzoyl.

Because of ease of preparation of intermediates, polymers in which the repeating unit of Formula 1 or 3 contain at most two X substituents other than halogens, and particularly those containing no substituents other than halogen, are preferred. The most easily prepared halogen-containing compounds are the relatively highly halogenated ones, i.e. those in which $n$ is between $m-7$ and $m-2$, inclusive, and these compounds constitute a more preferred type. In the $B_{10}$ series, an especially preferred class is that in which $n$ is 7 or 8, i.e., $m-3$ or $m-2$. In either the $B_{10}$ or $B_{12}$ series, chlorine is the preferred halogen because of its relatively low cost and ease of preparation of intermediates.

The A component

This moiety of the polycarboxamide polymers is supplied by the complementary difunctional reactant and is best defined by describing said reactant.

This reactant contains two functional groups selected from carboxyl, hydroxyl, thiol, primary amino and secondary amino. Preferably the two functional groups are the same, i.e., the preferred complementary reactants are dicarboxylic acids, diols, dithiols, di(primary amines), and di(secondary amines). When a secondary amine is present, the second carbon group attached to the amine is preferably a lower alkyl group.

Thus, a preferred embodiment of the complementary reactant has formula (4)                  Y—R—Y' where Y and Y' each may be carboxyl, hydroxyl, thiol, primary amino or secondary amino, and R is defined further below. In the most preferred embodiment Y and Y' consist of identical functional groups, i.e., Y'=Y.

Examples of diamine complementary reactants include ethylenediamine, trimethylenediamine, octamethylenediamine, dodecamethylenediamine, N,N' - dimethylhexamethylenediamine, cyclohexylene-1,4-diamine, o-phenylenediamine, p-phenylenediamine, benzidine, naphthylene-1,4-diamine, τ,τ'-diamino dibutyl oxide, and τ,τ'-diaminodihexyl sulfide.

Examples of dicarboxylic acid reagents include succinic acid, malonic acid, oxalic acid, pimelic acid, suberic acid, decane - 1,10 - dicarboxylic acid, cyclohexane - 1,4 - dicarboxylic acid, phthalic acid, terephthalic acid, naphthalene-1,3-dicarboxylic acid, and biphenylylene-2,2'-dicarboxylic acid.

Examples of diol and thiol reagents include di(β-hydroxyethyl)ether, decamethylene glycol, hexamethylene glycol, resorcinol, cyclohexane-1,4-diol, 2,2-di(4-hydroxyphenyl) propane, and the corresponding thiols.

mer by known techniques. Polymers containing such additives are included in the products of the invention.

Preparation of intermediates

The starting materials for the preparation of the $B_{10}$ and $B_{12}$ boron cage intermediates are compounds containing the $B_{10}H_{10}^=$ and $B_{12}H_{12}^=$ anions. These compounds are prepared as follows:

$B_{10}$ compounds

Preparation of $B_{10}H_{10}^=$

Ammonium decahydrodecaborate, $(NH_4)_2B_{10}H_{10}$, can be prepared in quantitative yield by the reaction of a decaboryl bis(lower dialkyl sulfide), e.g., decaboryl bis (dimethyl sulfide), $B_{10}H_{12}[(CH_3)_2S]_2$, with liquid ammonia at a temperature between about $-50°$ C. and $0°$ C. The product is isolated simply by evaporating any excess, unreacted ammonia. This process is described in detail in U.S. Patent 3,148,938 in the name of Walter H. Knoth, Jr. The decaboryl bis(lower dialkyl sulfide) is prepared by allowing decaborane, $B_{10}H_{14}$, to react with a lower dialkyl sulfide at a temperature of at least $0°$ C., and preferably at least $25°$ C., until approximately one mole of hydrogen per mole of decaborane is evolved. This process is described in detail in U.S. Patent 3,154,561 in the name of Earl L. Muetterties.

The $NH_4^+$ cation may be exchanged by ion-exchange methods to prepare compounds wherein the cation is as previously defined. For example, a solution of $$(NH_4)_2B_{10}H_{10}$$

in 30 ml. of water is passed through a 0.5″ diameter chromatography column containing 80 ml. of a commercial acidic exchange resin (Amberlite IR 120–H, the acid form of a crosslinked polystyrenesulfonic acid). The water effluent is clear, colorless and acidic. The column is rinsed with more water until the effluent is no longer acidic and the water fractions are combined. Evaporation of the combined aqueous solutions under reduced pressure (1 mm. mercury) at a temperature of about $40°$ C. leaves a yellow viscous liquid which is $H_2B_{10}H_{10} \cdot (H_2O)_3$. The compound can also be written as $(H_3O)_2B_{10}H_{10} \cdot H_2O$. It is neutralized with $(CH_3)_4NOH$ to yield $[(CH_3)_4N]_2B_{10}H_{10}$, with isopropylamine to yield $(C_3H_7NH_3)_2B_{10}H_{10}$.

By substituting other amine bases for liquid ammonia in the process for preparing $(NH_4)_2B_{10}H_{10}$, a wide range of substituted ammonium derivatives can be obtained, e.g., trimethylamine yields $[(CH_3)_3NH]_2B_{10}H_{10}$, and isopropylamine yields $[(CH_3)_2CHNH_3]_2B_{10}H_{10}$. Similarly, tert-butylamine yields $[(CH_3)_3CNH_3]_2B_{10}H_{10}$ and butyl amine yields $(C_4H_9NH_3)_2B_{10}H_{10}$.

The replacement of one cation by another is detailed in assignee's copending application Ser. No. 237,392, filed November 13, 1962, in the name of Walter H. Knoth, Jr.

Preparation of $B_{10}$ dicarboxylic acids $(NH_4)_2B_{10}H_{10}$ is first converted to the bisdiazonium compound $B_{10}H_8(N_2)_2$ by reaction with $NaNO_2/HCl$ in aqueous solution at $15°$ C. or lower, followed by reduction of the intermediate product (which is not isolated) with zinc and hydrochloric acid. The bisdiazonium compound is separated from the crude solid product by extraction with alcohol. This process is described in detail in assignee's copending application Ser. No. 186,270, filed April 9, 1962, in the name of Walter H. Knoth, Jr. now abandoned.

$B_{10}H_8(CO)_2$ can then be prepared by reacting $$B_{10}H_8(N_2)_2$$

with carbon monoxide at 125–250° C. and 500–1,000 atmospheres. $B_{10}H_8(CO)_2$ is the sole product. Halogen groups (X in Formulas 1 and 2) can be introduced into the $B_{10}$ dicarbonyls just described by reacting a dicarbonyl with the appropriate free halogen in aqueous solution at 0–100° C. The halogenated carbonyls are obtained by evaporation of the solutions, which gives hydrates of the halogenated acids, followed by dehydration of the latter by heating. The foregoing products and processes are described in detail in U.S. 3,166,378.

The $B_{10}$ dicarboxylic acids are prepared by reacting $B_{10}$ dicarbonyls with water, as described in the preceding paragraph, or, preferably, with an equivalent amount of a hydroxide containing the cation M. The cation, M, so introduced can be replaced by any other cation that can be a value of M by conventional exchange-reaction techniques, including the use of ion-exchange resins. These processes are described in U.S. Patent 3,166,378, and in more detail in said application Ser. No. 237,392.

Preparation of $B_{10}$ diisocyanates

A solution consisting of 1.0 g. of $B_{10}H_8 \cdot 2CO$ in 20 ml. of acetonitrile is added dropwise and with stirring to a slurry of 0.9 g. of sodium azide in 10 ml. of acetonitrile. The temperature rises to 50° C. and 230 ml. of nitrogen gas is evolved over a 1-hour period. The reaction mixture is filtered into an aqueous solution of $(CH_3)_4NCl$ and the solid which precipitates is separated. It is crystallized from water to obtain 0.7 g. of $[(CH_3)_4N]_2B_{10}H_8(NCO)_2$. The identity of the compound is confirmed by its infrared absorption spectrum and by elemental analyses.

*Analysis.*—Calc'd for $[(CH_3)_4N]_2B_{10}H_8(NCO)_2$: B, 31.0; C, 34.5; H, 9.2; N, 16.1. Found: B, 31.0; C, 34.1; H, 9.2; N, 16.2.

The ultraviolet spectrum of the compound in acetonitrile shows the following: $\lambda_{max.}$ 217 ($\epsilon = 22,800$).

The M component may be exchanged for other M's through ion-exchange methods.

A solution, consisting of 4.0 g. of $$[(CH_3)_4N]_2B_{10}H_8(NCO)_2$$

in 125 ml. of $CH_3CN$, is cooled to 5° C. and chlorine gas is passed through for 4.5 hours, maintaining the temperature at 5–10° C. The solution, which is dark blue, is allowed to stand about 18 hours at atmospheric temperature and the blue color fades to yellow. The solvent is removed by evaporation to obtain a viscous liquid as the residue. The liquid is stirred with ethyl alcohol and a solid separates. The solid, which is $[(CH_3)_4N]_2B_{10}Cl_8(NCO)_2$, is removed and dried to obtain 5.6 g. of product.

*Analysis.*—Cal'd for $[(CH_3)_4N]_2B_{10}Cl_8(NCO)_2$: B, 17.3; C, 19.2; H, 3.8; Cl, 45.4; N, 9.0. Found: B, 16.6; C, 19.5, 19.7; H, 3.9, 4.2; Cl, 46.0; N, 9.0.

These procedures are detailed in said application Ser. No. 237,392.

Preparation of $B_{10}$ diamines

A mixture of $B_{10}H_8 \cdot 2N_2$ and liquid ammonia heated at 200° C. in a sealed platinum tube at 1000 lbs. pressure will produce $H_2B_{10}H_8(NH_2)_2$. It can also be prepared by reacting $B_{10}H_8 \cdot 2CO$, $H_2NOSO_3H$ and NaOH at room temperature, or by refluxing $[(CH_3)_4N]_2B_{10}H_8(NCO)_2$ with 5% NaOH.

Again, ion-exchange methods enable one to alter the cationic component of the product.

The chlorinated diisocyanates obtained above may be refluxed with water, ethyl alcohol and NaOH to obtain $B_{10}$ chlorinated diamines.

These procedures are explained in said application Ser. No. 237,392.

Preparation of $B_{10}$ dithiols $B_{10}$ dithiols may be prepared by treating $B_{10}H_8 \cdot 2N_2$ with $H_2S$ and heating at 150° C. or more under autogenous pressure. Halogenated dithiols may be obtained by starting with the halogenated $N_2$ compound.

These procedures are detailed in said application Ser. No. 237,392.

Preparation of $B_{10}$ diols

To obtain compounds containing the $B_{10}H_8(OH)_2^=$ ion, $(NH_4)_2B_{10}H_{10}$ is reacted with N-methylpyrrolidone in the From the foregoing, the polymers of the invention may alternatively be described as polycarboxamides having recurring units of the formula (5)
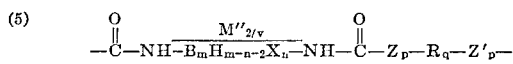

where M, $v$, X, $m$ and $n$ are defined as previously; Z and Z' are the same or different and represent O (oxygen), S (sulfur) or

where Y is hydrogen or lower alkyl; $p$ is 0 (zero) or 1, $q$ is 0 or 1, $p$ being 0 when $q$ is 0; and R is (a) a divalent hydrocarbyl group free of aliphatic unsaturation which may be interrupted by O, S or N atoms, or (b) a divalent group of the formula (6)
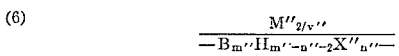

where M'', $v''$, $m''$, $n''$, and X'' have the same definitions as M, $v$, $m$, $n$, and X as previously set forth.

When R is a divalent hydrocarbyl group, it may be further defined as divalent, aliphatically saturated hydrocarbyl of from 2–12 carbons (e.g., alkylene, cycloalkylene, cycloalkylenedialkylene, alkylenebis(cycloalkylene), arylene, aralkylene, alkarylene, alkylenediarylene, or arylenedialkylene), in which any carbon chain can be interrupted in a non-cyclic portion thereof by up to one or two separated oxygen, sulfur, or nitrogen hetero atoms, said hetero atoms being removed by at least one carbon and preferably two carbons from the functional groups bonded to R.

From Formula 5 it is evident that the term "polycarboxamide" defines a polymer having the recurring linkage

This linkage can be present as $$-NH-\overset{O}{\overset{\|}{C}}-O-$$

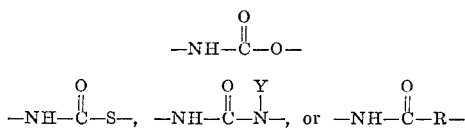

Thus the term "polycarboxamide" includes the terms "polyurethan," "polythiourethan" and "polyurea."

The process

In the process of the reaction, equivalent quantities of the diisocyanate polyboron reactant and complementary difunctional reactant are ordinarily used. Nonequivalent quantities can be used if desired, but polymers of relatively low molecular weight result. Since the reaction mixtures may contain more than one of the polyboron diisocyanates and/or difunctional reactants, the polymers of the invention include copolycarboxamides formed from such mixtures.

In addition to the monomeric starting materials described above, there can be present, as reactants, compounds that polymerize by ring-opening. The products of the invention therefore include copolymers containing repeating units derived from these cyclic monomers. Examples of such monomers include the lactams, e.g., ε-caprolactam, and τ-butyrolactam.

The reaction mixture may also include as coreactants, organic diisocyanates other than the polyboron diisocyanates. Such diisocyanates include, for example, ethylene diisocyanate, butylene-1,3-diisocyanate, cyclohexylene-1,2-diisocyanate, phenylene diisocyanates, etc.

In addition to the foregoing described reactants and coreactants, small amounts of monoisocyanates, monocarboxylic acids, mono(primary or secondary) amines, mono alcohols or thiols can be added to control the molecular weights of the polymers produced.

Optionally, a catalyst of the type commonly employed for condensation reactions of isocyanates with carboxylic acids, amines, alcohols and thiols may be added to the polymerization mixture. However, such a catalyst is not necessary.

A solvent or diluent is not required for any of the processes, since polymerization even of reactants that are solids at ordinary temperatures can be brought about by heating to high enough temperatures. To permit operation at lower temperatures, however, and in some cases to moderate the reaction between reactive starting materials, an inert solvent or diluent or mixture thereof is frequently used. In general, any liquid free of groups that react with isocyanates, carboxylic acids, primary amines, secondary amines, alcohols, and thiols in the absence of a catalyst can be used. Examples are hydrocarbons (e.g., benzene, xylene, heptane, cyclohexane, and decahydronaphthalene); carboxylic acid amides free of hydrogen bonded to nitrogen (e.g., N-methylpyrrolidone, dimethylformamide, and dipropylacetamide); nitriles (e.g., acetonitrile, butyronitrile, and benzonitrile); ethers (e.g., butyl ether and 1,2-dimethoxyethane); and chlorinated hydrocarbons (e.g., chlorobenzene, chloroform, and ethylene chloride). Mixtures of any of the above can be used.

The temperature can vary widely and will depend in part on the nature of the complementary difunctional reactant employed. For diamines, diols and dithiols, the process may be carried out at temperatures between 50 and 275° C., with 90 to 225° C. being preferred. For dicarboxylic acid reactants, the temperature may range between 90 and 400° C., with 200–350° C. being preferred.

Pressure is not a critical factor in the process, for the reaction may be carried out at atmospheric, subatmospheric or superatmospheric pressures. The pressures used for most convenience are atmospheric pressure or the autogenous pressures of a closed system.

Time is not a critical factor of the process. It can vary widely depending on the reactants, the solvent (if any), the temperature, and the molecular weight desired, and can range from 1 hour to several days. The progress of the polymerization can be followed by taking out small samples of the reaction mixture, determining their infrared absorption spectra, and observing to what extent absorptions characteristic of the reactants have disappeared and absorptions characteristic of the product are present.

The polymeric products can be isolated by evaporating any volatile materials present or by drowning the reaction mixture in a non-solvent and filtering, washing, and drying the product. Water, a lower alkanol, or an inert hydrocarbon such as heptane is usually suitable as a non-solvent.

The polymers of the invention are solids or viscous liquids and are stable to air and water.

The preferred polymers, particularly for use in preparing films, have molecular weights above 10,000. However, polymers of lower molecular weight, e.g., in the 3,000–10,000 range, can be used in preparing coatings.

The products of the invention are characterized by the fact that on treatment with aqueous mineral acids, e.g., hydrochloric acid, they are hydrolyzed to give (a) the polyboron diamine corresponding to the polyboron diisocyanate used to prepare the polymer, i.e.,

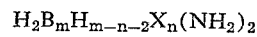

which can also be written as $B_mH_{m-n-2}X_n(NH_3)_2$ and (b) the complementary bifunctional reactant, or its mineral acid salt when said reactant is an amine. The formula of the complementary bifunctional reactant so produced can be written as A-$Z_p$-$R_q$-$Z'_p$-A where $p$ is 0 or 1, A is —COOH when $p$ is 0 and A is —H when $p$ is 1, and Z, R, Z' and $q$ are defined as in Formula 5.

Inert materials such as dyes, pigments, fillers, delusterants, plasticizers, and antioxidants can be incorporated in the polymers, either by being included in the polymerization mixtures or by being mixed with the preformed polypresence of concentrated hydrochloric acid at 170° C. The compound $B_{10}H_8$(N-methylpyrrolidone)$_2$ thus produced is heated with sodium hydroxide to give the compound $Na_2B_{10}H_8(OH)_2$. The sodium ion can be exchanged for other cations, e.g., tetramethylammonium, by well-known ion-exchange techniques referred to above. Halogenated $B_{10}$ diols are prepared by direct reaction of the appropriate halogen with an acidic aqueous solution of $H_2B_{10}H_8(OH)_2$, obtained by simply acidifying $$Na_2B_{10}H_8(OH)_2$$

at 25–100° C. For example, $[(CH_3)_4N]_2B_{10}Cl_7(OH)_2$ may be prepared by the following procedure.

A reaction vessel is charged with 60 g. of bis,N-methyl-2-pyrrolidone)octahydrodecaborane(8) and a solution of 30 g. of sodium hydroxide in 500 ml. of water. The mixture is refluxed for one hour. It is cooled and sufficient hydrochloric acid is added to form a neutral solution. Chlorine gas is bubbled into the solution and the solution is gradually heated to the boiling point over a period of one hour and ten minutes. Passage of chlorine is stopped and sufficient aqueous sodium hydroxide is added to form a neutral solution. The reaction mixture is now poured onto 50 g. of $(CH_3)_4NOH$. The mixture is cooled and the solid product which is present is separated by filtration. It is recrystallized from water containing a small amount of acetonitrile to obtain $$[(CH_3)_4N]_2B_{10}HCl_7(OH)_2$$

The infrared absorption spectrum of the product shows a small band at $4.0\mu$ (B—H bond).

*Analysis.*—Calc'd for $[(CH_3)_4N]_2B_{10}HCl_7(OH)_2$: C, 17.8; H, 5.0; N, 5.1; Cl, 46.1. Found: C, 18.2; H, 5.1; N, 5.1; Cl, 46.5.

These processes are also described in said application Ser. No. 237,392.

Preparation of $B_{10}$ compounds containing X substituents

The usual processes of halogenation, alkylation, and acylation may be employed. The halogens may be used to introduce halo substituents, olefins to introduce alkyl substituents, acyl halides for $$-\overset{O}{\underset{\|}{C}}-Q$$

etc.

$B_{12}$ compounds

Preparation of $B_{12}H_{12}^=$

The primary starting material for the preparation of the $B_{12}$ compounds is $B_2H_6$. Any alkali-metal salt of the acid $H_2B_{12}H_{12}$ can be prepared by the reaction of the appropriate alkali-metal hydroborate, e.g., $NaBH_4$, with diborane in the presence of an ether such as ethyl ether or 1,2-dimethoxyethane. The process is carried out in a closed system at a temperature of at least 100° C. and at autogenous pressure, which pressure should be at least three atmospheres. The product can be recrystallized from ethers such as ethyl ether or tetrahydrofuran or mixtures thereof. Any organic solvent of crystallization can be removed by mixing the product with water and distilling out the organic solvent. The product is then isolated by evaporation. The sodium salt is thus obtained as a hydrate, the exact degree of hydration depending on the extent of drying. Hydrates of the acid $H_2B_{12}H_{12}$ can be prepared by simply acidifying the sodium salt with a strong mineral acid such as HCl or by bringing a solution of the sodium salt into contact with an acidic cation-exchange resin. The acid hydrates are isolated by evaporation, the degree of hydration obtained again depending on the extent of evaporation. These processes are described in assignee's copending application Ser. No. 38,099, filed May 23, 1960, in the name of Henry C. Miller and Earl L. Muetterties now abandoned.

The $H^+$ cation may be exchanged by ion-exchange methods to prepare compounds containing a broad range of cations, as previously described.

Preparation of $B_{12}$ dicarboxylic acids $B_{12}H_{10}(CO)_2$ is first prepared by reacting a hydrate of $H_2B_{12}H_{12}$ with carbon monoxide at 60–150° C. and 500–1,000 atmospheres. This process is described in assignee's copending application Ser. No. 206,554, filed June 28, 1962, in the name of John C. Sauer.

Compounds containing the $B_{12}H_{10}(COOH)_2^=$ anion are prepared by reacting the corresponding dicarbonyl, $B_{12}H_{10}(CO)_2$ with water or an aqueous hydroxide containing the cation M of Formula 5. The resulting compounds of the formula $M_{2/v}B_{12}H_{10}(COOH)_2$ can be halogenated directly with the appropriate free halogen in aqueous solution at temperatures of about 25–150° C. The exact temperature depends on the halogen to be introduced and the degree of substitution desired. For example, treatment of $Cs_2B_{12}H_{10}(COOH)_2$ with excess chlorine at 90–100° C. in aqueous solution, followed by cation exchange with tetramethylammonium chloride, gives $$[(CH_3)_4N]_2B_{12}H_2Cl_8(COOH)_2$$

Esters, acid halides, and amides of these acids are made in the same manner as the corresponding $B_{10}$ acid derivatives. The foregoing processes are described in Ser. No. 246,636, filed December 21, 1962, in the name of H. C. Miller and E. L. Muetterties.

Preparation of $B_{12}$ diisocyanates

A solution of $B_{12}H_{10} \cdot 2CO$ in acetonitrile is added with stirring to a solution of sodium azide in acetonitrile. After nitrogen gas evolution has ceased, the reaction mixture is filtered and the filtrate evaporated by a stream of air until a viscous syrup remains. The syrup is diluted with water and an aqueous solution of $(CH_3)_4NCl$ is added with stirring. A white precipitate forms which is separated to obtain $[(CH_3)_4N]_2B_{12}H_{10}(NCO)_2$. The product may be recrystallized from water.

Chlorinated diisocyantes may be prepared by bubbling gaseous chlorine through an aqueous solution of $B_{12}H_{10} \cdot 2CO$. After chlorination is complete, the solution is evaporated to dryness in a sublimation unit and the residue is sublimed to obtain a sublimate on the water cooled condenser. A portion of the sublimate is dissolved in dry $CH_3CN$ and a suspension of $NaN_3$ in $CH_3CN$ added to the solution with stirring. The mixture is heated to incipient reflux temperature for 1 hour and then evaporated to dryness. The residue is dissolved in water and an aqueous solution of $(CH_3)_4NCl$ is added in excess. The precipitate which forms is separated and heated to boiling with 60 ml. of water. The solid dissolves partially and the hot mixture is filtered. The filtrate is chilled and a solid precipitates. The compound, which is $$[(CH_3)_4N]_2B_{12}HCl_9(NCO)_2$$

is separated, washed and dried.

Preparation of $B_{12}$ diamines $Na_2B_{12}H_{12} \cdot 2H_2O$ and $H_2NOSO_3H$ in 250 ml. of water is neutralized by adding, at a temperature below 25° C. a solution of sodium hydroxide in water. The solution is heated cautiously until an exothermic reaction begins and is then cooled to moderate the reaction which continues for about 30 minutes. The solution is now cooled to about 5° C. and the precipitate which forms is separated to obtain 9 g. of $H_2B_{12}H_{10}(NH_2)_2$ as a white crystalline solid.

Preparation of $B_{12}$ diols

A solution consisting of $Na_2B_{12}H_{12} \cdot 2H_2O$ and N-methyl-2-pyrrolidone is stirred and hydrochloric acid is added. The mixture is filtered and the filtrate distilled until a pot temperature of 205° C. is reached. The mixture is held at this temperature for 4 hours and it is then poured into ethyl alcohol. The precipitate which forms is separated by filtration. It is purified by dissolving in acetonitrile and reprecipitating with ethanol. The product (7.8 g.) so obtained (which is

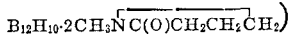

is mixed with 50 ml. of 6% aqueous NaOH solution, the mixture is refluxed for 4 hours and then allowed to cool.

A portion of the above reaction mixture is added with stirring to a solution of 6 g. of $(CH_3)_4NOH$ in 400 ml. of ethyl alcohol. The mixture is evaporated to dryness, leaving a syrupy residue. The residue is mixed with 150 ml. of isopropyl alcohol and forms an oil. The oil is crystallized from solution in aqueous ethyl alcohol to yield bis(tetramethylammonium) dihydroxydecahydrododecaborate (2−).

Preparation of $B_{12}$ dithiols

A mixture consisting of hydrated crystalline $$(H_3O)_2B_{12}H_{12}$$

and an excess of hydrogen sulfide is heated in a pressure vessel under autogenous pressure with agitation for 4 hours at 100° C. The vessel is cooled, vented and flushed with nitrogen. The reaction mixture is neutralized with cesium hydroxide and the precipitate which forms is separated and recrystallized twice from water. The product is $Cs_2B_{12}H_{10}(SH)_2$.

Preparation of $B_{12}$ anions containing X groups

The usual processes of halogenation, alkylation, and acylation may be employed. The halogens may be used to introduce halo substituents, olefins to introduce alkyl substituents; acyl halides, for

etc.

The following examples illustrate the products and processes of the invention. For the sake of simplicity, the equations shown in the various examples are partly schematic in that they show only the formation of the repeating unit of Formula 3. It is understood that the actual product of each example is in fact a polymer containing the repeating unit shown.

EXAMPLE 1

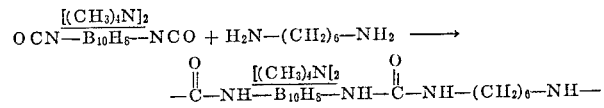

A tubular glass reactor was charged with 2.500 g. of $[(CH_3)_4N]_2B_{10}H_8(NCO)_2$, 0.8329 g. of hexamethylenediamine, and 40 ml. of anhydrous acetonitrile. The reactor was then flushed with nitrogen, sealed at atmospheric pressure, and heated at about 95° C. for eight days. Within the first twenty hours, an essentially complete solution formed, and within about three days, an extremely viscous product precipitated from this solution. The reactor was cooled and opened, and the viscous product was separated and dried thoroughly at 100° C./0.1 mm., to give a tack-free, solid polyurea having the repeating unit shown in the above equation.

*Analysis.*—Calcd. for $C_{16}H_{40}B_{10}N_6O_2$: C, 42.1; H, 8.8; N, 18.3. Found: C, 41.5; H, 10.4; N, 18.5.

The inherent viscosity of an 0.25% solution of the polymer in water was 0.88, whereas the inherent viscosity of an 0.25% solution of the polymer in aqueous 1% tetramethylammonium chloride was only 0.12. This viscosity behavior, which is typical of polyelectrolytes in aqueous solutions, was evidence that a polymer had indeed been formed. The infrared absorption spectrum of the polymer (mineral-oil mull) had absorption at 2.95μ (amide N—H), 3.29μ (overtone of amide N—H), 3.41μ and 3.49μ (saturated C—H), 4.09μ (B—H), 6.2μ (broad) and 6.5μ (amide C=O).

A brilliantly clear film of the polymer was made at 190° C./1000 lb./sq. in. in a Carver press. Tough, hard, clear coatings that adhered well to steel, aluminum, and glass were made on these substrates from aqueous solutions of the polymer containing about 0.5% glycerol based on the polymer, by flowing out a layer of the solution and evaporating the water.

EXAMPLE 2

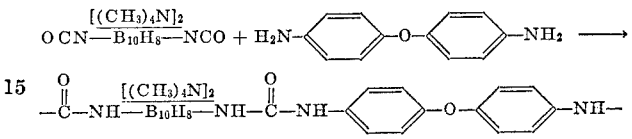

A reactor like that of Example 1 was charged with 0.9820 g. of $[(CH_3)_4N]_2B_{10}H_8(NCO)_2$ and 0.5642 g. of 4,4′-di(aminophenyl) ether, flushed with nitrogen, and sealed at atmospheric pressure. The mixture was heated at 225° C. for about five minutes, at 180° C. for four hours, and then at 195° C. for 18 hours. The product obtained after cooling and opening the reactor was a solid polyurea having the repeating unit shown in the above equation. It was soluble with difficulty in dimethylacetamide, dimethylformamide, and dimethyl sulfoxide.

*Analysis.*—Calcd. for $C_{22}H_{44}B_{10}N_6O_3$: N, 15.3. Found: N, 14.7.

The infrared absorption spectrum of the polymer (mineral-oil mull) showed bands at 3.0μ and 3.1μ (amide N—H) and at 6.28μ and 6.65μ (amide C=O).

A mixture of 0.6 g. of the polyurea and 20 ml. of concentrated hydrochloric acid was refluxed for four hours. Glacial acetic acid (20 ml.) was added, and the mixture was refluxed for four hours more and evaporated to dryness. The solid residue was charged to a tubular glass reactor along with 8 ml. of constant-boiling hydrobromic acid. The reactor was cooled to −80° C., evacuated, sealed, heated at 140° C. for 18 hours, cooled, and opened. The solid and liquid in the reactor were separated by filtration. Infrared analysis showed that the dihydrobromide of 4,4′-di(aminophenyl) ether was present in the solid. Evaporation of the filtrate to dryness gave $$B_{10}H_8(NH_3)_2$$

identified by comparison of its infrared absorption spectrum with that of an authentic sample.

EXAMPLE 3

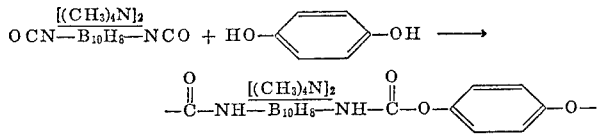

A reactor like that of Example 1 was charged with an intimate mixture of 1.5823 g. of $$[(CH_3)_4N]_2B_{10}H_8(NCO)_2$$

and 0.5000 g. of hydroquinone, flushed with nitrogen, evacuated, sealed, and heated at 220–240° C. for three hours. During this time a viscous melt was formed. The reactor was cooled and opened, and the solid product was washed with warm water and dried, to give a solid polyurethan having the repeating unit shown in the above equation.

*Analysis.*—Calcd. for $C_{16}H_{28}B_{10}N_4O_4$: C, 41.9; H, 8.3; N, 12.2. Found: C, 41.5; H, 8.6; N, 12.8.

The inherent viscosity of the polymer was 0.06 (0.25% solution in dimethylformamide). The infrared absorption spectrum (mineral-oil mull) had absorption at 3.2μ (amide N—H), 4.0μ (B—H), and 6.3μ (amide C=O).

EXAMPLE 4

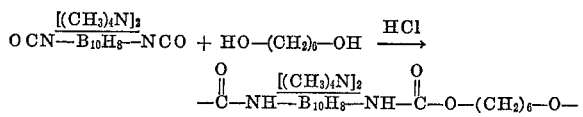

A reactor like that of Example 1 was charged with 0.5715 g. of $[(CH_3)_4N]_2B_{10}H_8(NCO)_2$, 0.2107 g. of 1,6-hexanediol, and 0.1 g. of anhydrous hydrogen chloride. The reactor was evacuated, sealed under vacuum, and heated at 125° C. for three hours. The reactor was cooled and opened, and the layer of solid that had formed on the walls of the reactor was separated from other material therein. This product was a polyurethan having the repeating units of the above equation, as shown by its infrared absorption (mineral-oil mull) at $3.0\mu$ (amide N—H), $4.03\mu$ (B—H), and $6.18\mu$ (amide C=O).

EXAMPLE 5

$$OCN-\underset{[(CH_3)_4N]_2}{B_{10}H_8}-NCO + HS-(CH_2)_4-SH \longrightarrow$$

$$-\overset{O}{\underset{\|}{C}}-NH-\underset{[(CH_3)_4N]_2}{B_{10}H_8}-NH-\overset{O}{\underset{\|}{C}}-S-(CH_2)_4-S-$$

A reactor like that of Example 1 was charged with 2.5071 g. of $[(CH_3)_4N]_2B_{10}H_8(NCO)_2$, 0.8627 g. of 1,4-butanedithiol, and 10 ml. of dimethylacetamide. The reactor was flushed with nitrogen and sealed at atmospheric pressure. It was heated at about 95° C. for six hours, at 150–107° C. for seven days, and at 225° C. for five days. A homogeneous mixture formed soon after the temperature was raised to 225° C. The reactor was cooled and opened, and volatile material was evaporated under reduced pressure. The non-volatile product was a solid polythiourethan having the repeating unit of the above equation. The infrared absorption spectrum of the product (mineral-oil mull) showed absorption at $3.0\mu$ (amide N—H), $4.0\mu$ (strong; B—H), and $6.2\mu$ (strong) and $6.5\mu$ (weak) (amide C=O).

EXAMPLE 6

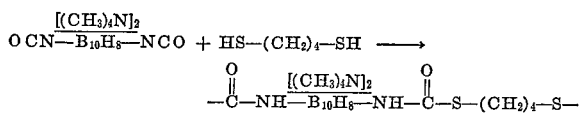

In an atmosphere of nitrogen, a reactor like that of Example 1 was charged with 1.0900 g. of $$[(CH_3)_4N]_2B_{10}H_8(NCO)_2$$

0.6333 g. of sebacic acid, and 5 ml. of acetonitrile. The open end of the reactor was closed with a rubber cap fitted with a narrow-bore gas-inlet tube (the lower end of which was free of the reaction mixture) and a similar gas-exit tube. A slow stream of nitrogen was passed through the reactor from the gas-inlet tube throughout the process. Thus, volatile material could be released slowly from the reactor through the gas-exit tube, but only nitrogen could enter the reactor. The reactor was heated at 100° C. for about one hour, during which time most of the acetonitrile volatilized. It was then heated at 200° C. for 18 hours, at 280° for three hours, and at 340° C. for one hour. At this point a small sample of the reaction mixture showed infrared absorption corresponding to unreacted isocyanate groups. The mixture was therefore heated at 340° C. for 24 hours more. A sample of the mixture now showed increased carbonyl absorption and greatly reduced isocyanate absorption. The mixture was heated at 340° C. for 18 hours, the reactor was cooled and opened, and the solid product was washed with hot water and dried. There was thus obtained a polyamide having repeating units of the type shown in the above equation. The infrared absorption spectrum of the product (mineral-oil mull) showed absorption at $3.1\mu$ (amide N—H), $4.0\mu$ (B—H), and 6.3 and $6.5\mu$ (amide C=O).

EXAMPLE 7

Copolyurea of $[(CH_3)_4N]_2B_{12}HCl_9(NCO)_2$ and 2,4-tolylene diisocyanate with 4,4'-di(aminophenyl) ether A mixture of 0.1552 g. of $[(CH_3)_4N]_2B_{12}HCl_9(NCO)_2$, 0.8128 g. of 2,4-tolylene diisocyanate, 0.9795 g. of 4,4'-di(aminophenyl) ether, and 25 ml. of 1,2-dimethoxyethane was charged to a reactor like that of Example 1. The reactor was sealed, evacuated, held at ordinary temperature (20–30° C.) for 2.5 days, and then heated at 85° C. for 24 hours. The reactor was cooled, and the reaction mixture was filtered. The infrared absorption spectrum of the solid thus obtained showed that some unreacted isocyanate groups were still present. A mixture of the product, 0.10 g. of 4,4'-di(aminophenyl) ether, and 15 ml. of 1,2-dimethoxyethane was charged to a similar reactor. The reactor was evacuated, sealed, and heated at 125° C. for four hours, after which it was cooled and opened, and the reaction mixture was drowned in water. The solid copolyurea that precipitated was separated by filtration and dried at 100° C./0.1 mm. over $P_2O_5$. The infrared absorption spectrum of the copolyurea (mineral-oil mull) had absorption at $3.1\mu$ (N—H), $4.1\mu$ (weak; B—H), and $6.1\mu$, $6.3\mu$, and $6.4\mu$ (amide C=O). Absence of absorption $4.5\mu$ indicated that the isocyanate groups had all reacted.

EXAMPLE 8

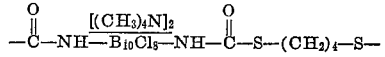

A reactor like that of Example 6 was charged with 0.7946 g. of $[(CH_3)_4N]_2B_{10}Cl_8(NCO)_2$, 0.1553 g. of 1,4-butanedithiol, and 20 ml. of acetonitrile, and the resulting solution was heated at 60–90° C. for 2.5 days in an atmosphere of nitrogen. At the end of this time the solid obtained by removing volatile material from a small sample of the polymerization mixture still showed slight absorption in the infrared corresponding to —NCO groups. 1,4-butanedithiol (0.2 g.) was added to the remainder of the mixture, and the reactor was sealed and heated at 120–130° C. for 48 hours. It was then cooled and opened, and volatile material was evaporated to give a solid polythiourethan having the repeating unit of the product of the above equation.

*Analysis.*—Calcd. for $C_{14}H_{34}B_{10}Cl_8N_4O_2S_2$: C, 22.5; H, 4.6; S, 8.5. Found: C, 20.5; H, 4.9; S, 6.8.

The infrared absorption spectrum of the product indicated essentially complete reaction of the diisocyanate.

EXAMPLE 9

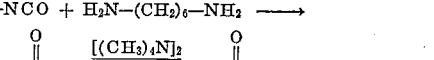

A reactor like that of Example 1 was charged with 1.9736 g. of $[(CH_3)_4N]_2B_{12}H_{10}(NCO)_2$, 0.6161 g. of hexamethylenediamine, and 20 ml. of acetonitrile. The reactor was cooled to about −80° C., evacuated, sealed, and heated at 95° C. for 3.5 days. The reactor was cooled to room temperature and opened, volatile material was removed from the product by evaporation, and the residual solid was washed with water and dried, to give a solid polyurea having the repeating unit of the above equation.

*Analysis.*—Calcd. for $C_{16}H_{50}B_{12}N_6O_2$: C, 39.4; H, 10.2; N, 17.2. Found: C, 39.1; H, 10.3; N, 16.8.

The inherent viscosity of the polymer (0.25% solution in dimethylformamide) was 0.18.

In addition to the foregoing examples, the following table discloses polyboron diisocyanates which can be reacted with the corresponding complementary reactant to obtain the desired polymer. The right hand column of the table indicates the general procedure by which the products may be prepared by referring to the appropriate detailed example.

TABLE

| | Polyboron Diisocyanate(s) | Complementary Reactant(s) | Procedure Used |
|---|---|---|---|
| 10 | $[(CH_3)_4N]_2B_{10}Cl_8(NCO)_2$ | $[(C_2H_5)_3NH]_2B_{10}H_8(COOH)_2$ | 6 |
| 11 | $[(C_4H_9)_4P]_2B_{10}Cl_8(NCO)_2$ | $Na_2B_{10}Cl_8(COOH)_2$ | 6 |
| 12 | $[(CH_3)_3S]_2B_{10}Cl_8(NCO)_2$ | Terephthalic acid | 6 |
| 13 | $CaB_{12}H_{10}(NCO)_2$ | 1,2-cyclohexanedicarboxylic acid | 6 |
| 14 | $Na_2B_{10}H_8(NCO)_2$ | Di(4-carboxybutyl) sulfide | 6 |
| 15 | $K_2B_{10}Br_8(NCO)_2$ | Di(4-aminocyclohexyl)methane | 1 |
| 16 | $MgB_{12}H_8(OCH_3)_2(NCO)_2$ | m-Phenylenediamine | 2 |
| 17 | $[(CH_3)_4N]_2B_{10}H_7(C_6H_{11})(NCO)_2$* plus $[(CH_3)_4N]_2B_{10}H_6(C_6H_{11})_2(NCO)_2$ | Di(3-aminopropyl) ether | 1 |
| 18 | $(C_5H_5NH)_2B_{12}H_3Cl_7(NCO)_2$* | Hexamethylenediamine plus N,N'-Dimethylhexamethylenediamine. | 9 |
| 19 | $Na_2B_{12}Cl_{10}(NCO)_2$ | $Na_2B_{12}Cl_{10}(NH_2)_2$ | 2 |
| 20 | $Na_2B_{12}H_5F_5(NCO)_2$ | Triethylene glycol | 4 |
| 21 | $Li_2B_{10}Cl_6(COCH_3)_2(NCO)_2$ | 1,10-decanediol | 4 |
| 22 | $[(C_6H_{13})_4N]_2B_{10}H_3I_5(NCO)_2$ | Di(6-hydroxyhexyl)methylamine | 4 |
| 23 | $BaB_{12}H_9(SC_5H_{11})(NCO)_2$ | 4-Di(2-hydroxyethyl)benzene | 4 |
| 24 | $K_2B_{10}H_6F_2(NCO)_2$ | $K_2B_{10}HCl_7(OH)_2$ | 3 |
| 25 | $[(CH_3)_4N]_2B_{10}H_8(NCO)_2$ | $[(CH_3)_3S]_2B_{10}Cl_8(SH)_2$ | 5 |
| 26 | $Rb_2B_{10}Br_4Cl_4(NCO)_2$ | 1,6-hexanedithiol | 8 |
| 27 | 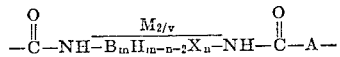$B_{10}Cl_7(OCH_2CH_2OCH_3)(NCO)_2$ | 1,4-butanedithiol plus 1,10-decanedithiol | 8 |
| 28 | $[(C_6H_5)_3S]_2B_{12}Br_{10}(NCO)_2$ | Dithiohydroquinone | 8 |
| 29 | $[(C_6H_5)_3PCH_3]_2B_{12}H_{10}(NCO)_2$ plus $[(C_6H_5)_3PCH_3]_2B_{10}H_8(NCO)_2$ | 1,5 naphthalenedithiol | 5 |

*$C_6H_{11}$ is cyclohexyl; $C_5H_5NH$ is pyridinium.

The polymers of the invention form tough, clear films which adhere well to steel, aluminum, glass, and other substrates as evidenced by Example 1. Thus, the polymers may be applied to the above-mentioned materials to form a hard, clear protective coating. In addition, the polymers may be pressed into a clear, hard, self-supporting film as evidenced by Example 1. These self-supporting films may be used to replace glass in instances where a clear substance is needed. The films are, thus, useful in many applications, for example, as light transparent neutron barriers and space vehicle windows resistant to outer space radiation.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polycarboxamide consisting essentially of recurring units of the formula $$-\overset{O}{\overset{\|}{C}}-NH-B_mH_{m-n-2}X_n-NH-\overset{O}{\overset{\|}{C}}-A-$$

wherein
M is a cation selected from the class consisting of a metal; $U_2U'NH^+$, $U_3U'N^+$, $U'_4P^+$, $U'_3S^+$, hydrogen, ammonium, hydrazonium, a complex cation of a metal, $U'NH_3^+$, $UU'NH_2^+$, $U'N_2H_4^+$, $U'_2N_2H_3^+$, $U'_3N_2H_2^+$, and $UU'_3N_2H^+$, wherein U is aliphatically saturated hydrocarbyl bonded to the respective N, P, and S atoms through aliphatic carbon; U' is aliphatically saturated hydrocarbyl, and any two U and U' groups can be joined to form a group selected from the class consisting of alkylene and oxygen-interrupted alkylene which forms a ring with the N, P, and S atoms, $v$ is the valence of M, $2/v$ is the ratio of M groups present to one $-B_mH_{m-n-2}X_n-$ group;

X is selected from the class consisting of halogen, hydrocarbyl, hydrocarbyloxy, hydrocarbyloxyhydrocarbyloxy, hydrocarbylcarbonyl, and hydrocarbylthio, wherein the hydrocarbyl groups are free of aliphatic unsaturation and contain up to 12 carbon atoms;

$m$ is a cardinal number selected from the class consisting of 10 and 12;

$n$ is a cardinal number of from 0 to $m-2$, inclusive, and

A is a moiety derived from a difunctional reactant in which the functional groups are selected from —COOH, —OH, —SH, —NH$_2$ and —NH (lower alkyl), said polycarboxamide having a molecular weight of at least 3000.

2. A polycarboxamide consisting essentially of recurring units of the formula $$-\overset{O}{\overset{\|}{C}}-NH-\overset{M_{2/v}}{\overline{B_mH_{m-n-2}X_n}}-NH-\overset{O}{\overset{\|}{C}}-Z_p-R_q-Z'_p-$$

wherein
M is a cation selected from the class consisting of a metal; $U_2U'NH^+$, $U_3U'N^+$, $U'_4P^+$, $U'_3S^+$, hydrogen, ammonium, hydrazonium, a complex cation of a metal, $U'NH_3^+$, $UU'NH_2^+$, $U'N_2H_4^+$, $U'_2N_2H_3^+$, $U'_3N_2H_2^+$ and $UU'_3N_2H^+$, wherein U is aliphatically saturated hydrocarbyl bonded to the respective N, P, and S atoms through aliphatic carbon; U' is aliphatically saturated hydrocarbyl, and any two U and U' groups can be joined to form a group selected from the class consisting of alkylene and oxygen-interrupted alkylene which forms a ring with the N, P, and S atoms, $v$ is the valence of M, $2/v$ is the ratio of M groups present to one $-B_mH_{m-n-2}X_n-$ group;

X is selected from the class consisting of halogen, hydrocarbyl, hydrocarbyloxy, hydrocarbyloxyhydrocarbyloxy, hydrocarbylcarbonyl, and hydrocarbylthio, wherein the hydrocarbyl groups are free of aliphatic unsaturation and are of at most 12 carbon atoms;

$m$ is a cardinal number selected from the class consisting of 10 and 12;

$n$ is a cardinal number of from 0 to $m-2$, inclusive;

Z and Z' are each selected from the class consisting of O, S, or $$\overset{Y}{\underset{|}{N}}$$

wherein Y is selected from the class consisting of hydrogen and lower alkyl;

$p$ and $q$ are each 0 or 1, inclusive, $p$ being 0 when $q$ is 0; and

R is selected from the class consisting of (a) a divalent hydrocarbyl group of 2 to 12 carbon atoms, inclusive, free of aliphatic unsaturation, which may be interrupted in a non-cyclic portion thereof by O, S, and N atoms; and (b) a divalent group of the formula

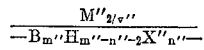

where $M''$, $v''$, $m''$, $n''$, and $X''$ have the same definitions as M, v, m, n, and X as previously set forth, said polycarboxamide having a molecular weight of at least 3000.

3. The polymer of claim 2 in which X is halogen, Z and Z' are the same and R is the divalent hydrocarbyl group defined in part (a) of the definition of R in claim 3.

4. The polymer of claim 2 wherein p is zero.

5. A polycarboxamide consisting essentially of recurring units of the formula

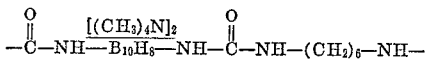

said polycarboxamide having a molecular weight of at least 3000.

6. A polycarboxamide consisting essentially of recurring units of the formula

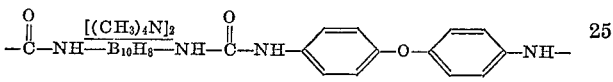

said polycarboxamide having a molecular weight of at least 3000.

7. A polycarboxamide consisting essentially of recurring units of the formula

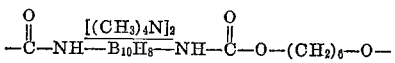

said polycarboxamide having a molecular weight of at least 3000.

8. A polycarboxamide consisting essentially of recurring units of the formula

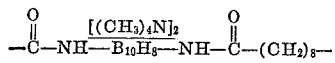

said polycarboxamide having a molecular weight of at least 3000.

9. A polycarboxamide consisting essentially of recurring units of the formula

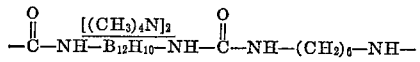

said polycarboxamide having a molecular weight of at least 3000.

References Cited

UNITED STATES PATENTS

| | | | |
|---|---|---|---|
| 3,148,938 | 9/1964 | Knoth | 23—14 |
| 3,154,561 | 10/1964 | Muetterties | 260—327 |
| 3,166,378 | 1/1965 | Knoth | 23—14 |
| 3,093,687 | 6/1963 | Clark et al. | 260—606.5 |
| 3,167,590 | 1/1965 | Heying | 260—606.5 |
| 3,258,479 | 6/1966 | Alexander et al. | 260—485 |
| 3,270,047 | 8/1966 | Heying et al. | 260—482 |
| 2,929,800 | 3/1960 | Hill | 260—77.5 |
| 2,888,438 | 5/1959 | Manfred | 260—453 |
| 2,939,851 | 6/1960 | Orchin | 260—453 |
| 3,328,355 | 6/1967 | Dawes et al. | 260—75 |

FOREIGN PATENTS

| | | |
|---|---|---|
| 720,525 | 3/1966 | Canada. |
| 729,528 | 3/1966 | Canada. |
| 956,391 | 4/1964 | Great Britain. |
| 956,392 | 4/1964 | Great Britain. |
| 956,393 | 4/1964 | Great Britain. |
| 956,394 | 4/1964 | Great Britain. |
| 956,395 | 4/1964 | Great Britain. |
| 1,309,439 | 10/1960 | France. |
| 854,701 | 11/1952 | Germany. |
| 1,089,974 | 9/1960 | Germany. |
| 956,256 | 4/1964 | Great Britain. |

OTHER REFERENCES

Cram et al., Organic Chemistry, page 275, McGraw-Hill (N.Y.) (1959).

Fieser et al., Organic Chemistry, 2nd ed., page 647, Heath and Co. (Boston) (1950).

Royals, Advanced Organic Chemistry, page 618, Prentice Hall (Englewood Cliffs), 1959.

Osborn, "Synthetic Ion-Exchangers," The MacMillan Co. (1956) (pages 15–16 cited as being of interest).

Journal of the American Chemical Society, vol. 84, Mar. 20, 1962, pages 1056–1058 relied upon.

Chemical and Engineering News, May 9, 1966, pages 88–98 relied upon.

Olin Mathieson Chemical Corporation, Technical Report No. 4, Quarterly Progress Report No. 2, report period Aug. 11, 1961 to Nov. 10, 1961, 5 pages.

DONALD E. CZAJA, *Primary Examiner.*

LEON J. BERCOVITZ, WALTER A. MODANCE, *Examiners.*

F. McKELVEY, H. I. MOATZ, *Assistant Examiners.*